United States Patent
Cottinet et al.

(10) Patent No.: US 10,001,829 B2
(45) Date of Patent: Jun. 19, 2018

(54) ELECTRONIC DEVICE COMPRISING A WAKE UP MODULE DISTINCT FROM A CORE DOMAIN

(71) Applicant: STMicroelectronics (Rousset) SAS, Rousset (FR)

(72) Inventors: Jonathan Cottinet, Bourgoin Jallieu (FR); Jean Claude Bini, Vence (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 139 days.

(21) Appl. No.: 14/852,513

(22) Filed: Sep. 12, 2015

(65) Prior Publication Data

US 2016/0170467 A1    Jun. 16, 2016

(30) Foreign Application Priority Data

Dec. 16, 2014  (FR) ..................... 14 62541

(51) Int. Cl.
*H04R 29/00*    (2006.01)
*G06F 1/32*     (2006.01)
(Continued)

(52) U.S. Cl.
CPC ............ *G06F 1/324* (2013.01); *G06F 1/3287* (2013.01); *G06F 3/167* (2013.01); *G10L 15/22* (2013.01); *H04W 52/0229* (2013.01); *H04W 52/0251* (2013.01); *H04W 52/0293* (2013.01); *G10L 15/28* (2013.01); *G10L 2015/088* (2013.01); *H04W 76/28* (2018.02); *Y02D 70/00* (2018.01); *Y02D 70/26* (2018.01)

(58) Field of Classification Search
CPC ......... G06F 1/3287; G06F 1/324; G06F 3/167
USPC ........ 713/322, 323, 400, 500, 300; 704/275, 704/232, 231, 235, 236; 1/1; 381/56
See application file for complete search history.

(56) References Cited

U.S. PATENT DOCUMENTS 6,070,140 A  *  5/2000  Tran ...................... G06F 1/3203
                                              704/232
8,860,890 B2 * 10/2014  Jang ......................... H04N 5/63
                                              348/14.03

(Continued)

FOREIGN PATENT DOCUMENTS

| CN | 103310785 A | 9/2013 |
| CN | 104038864 A | 9/2014 |
| CN | 205051764 U | 2/2016 |

*Primary Examiner* — Aurel Prifti
(74) *Attorney, Agent, or Firm* — Slater Matsil, LLP

(57) ABSTRACT

An electronic device includes an appended module coupled to a core having a standby state comprising a first power supply circuit, a first clock and a circuit that recognizes multiple vocal commands timed by the first clock. The appended module includes a second power supply circuit independent of the first power supply circuit, a second clock independent of the first clock and having a frequency lower than that of the first clock, digital unit timed by the second clock including a sound capture circuit that delivers a processed sound signal, and a processing unit configured in order, in the presence of a parameter of the processed sound signal greater than a threshold, to analyze the content of the processed sound signal and to deliver, when the content of the sound signal comprises a reference pattern, an activating signal to the core that can take it out of its standby state.

19 Claims, 1 Drawing Sheet

(51) Int. Cl.
*G06F 3/16* (2006.01)
*H04W 52/02* (2009.01)
*G10L 15/22* (2006.01)
*G10L 15/08* (2006.01)
*G10L 15/28* (2013.01)

(56) References Cited

U.S. PATENT DOCUMENTS

| | | | | |
|---|---|---|---|---|
| 8,972,252 | B2* | 3/2015 | Hung | G06F 1/3215 |
| | | | | 704/230 |
| 9,256,269 | B2* | 2/2016 | Mallinson | G06F 1/3206 |
| 2003/0128157 | A1* | 7/2003 | Salkhi | G01S 19/235 |
| | | | | 342/357.62 |
| 2004/0128137 | A1* | 7/2004 | Bush | G10L 15/26 |
| | | | | 704/275 |
| 2004/0243864 | A1* | 12/2004 | Oshima | G06F 1/3203 |
| | | | | 713/300 |
| 2005/0064829 | A1* | 3/2005 | Kang | H04W 52/028 |
| | | | | 455/127.1 |
| 2006/0068851 | A1* | 3/2006 | Ashman, Jr. | G06F 1/1626 |
| | | | | 455/566 |
| 2006/0075267 | A1* | 4/2006 | Tokue | G06F 1/3203 |
| | | | | 713/300 |
| 2006/0116876 | A1* | 6/2006 | Marcus | G10L 15/08 |
| | | | | 704/231 |
| 2006/0149984 | A1* | 7/2006 | Yasumoto | G01S 19/23 |
| | | | | 713/322 |
| 2006/0271797 | A1* | 11/2006 | Ginggen | G06F 1/3203 |
| | | | | 713/300 |
| 2007/0094486 | A1* | 4/2007 | Moore | G06F 9/4401 |
| | | | | 713/1 |
| 2008/0098252 | A1* | 4/2008 | Liu | G06F 1/12 |
| | | | | 713/500 |
| 2008/0133228 | A1* | 6/2008 | Rao | G10L 15/24 |
| | | | | 704/231 |
| 2010/0066684 | A1* | 3/2010 | Shahraray | G06F 3/038 |
| | | | | 345/173 |
| 2010/0185448 | A1* | 7/2010 | Meisel | G10L 15/22 |
| | | | | 704/256.1 |
| 2011/0022864 | A1* | 1/2011 | Haiplik | G06F 1/14 |
| | | | | 713/322 |
| 2011/0063094 | A1* | 3/2011 | Meiertoberens | A61B 5/0002 |
| | | | | 340/12.5 |
| 2011/0066874 | A1* | 3/2011 | Shen | H04W 52/028 |
| | | | | 713/400 |
| 2011/0166856 | A1 | 7/2011 | Lindahl et al. | |
| 2011/0211746 | A1* | 9/2011 | Tran | G06K 9/00 |
| | | | | 382/137 |
| 2012/0059845 | A1* | 3/2012 | Covell | G06F 17/30743 |
| | | | | 707/769 |
| 2012/0215537 | A1* | 8/2012 | Igarashi | G06F 3/167 |
| | | | | 704/249 |
| 2012/0221330 | A1* | 8/2012 | Thambiratnam | G10L 25/84 |
| | | | | 704/235 |
| 2012/0317085 | A1* | 12/2012 | Green | G06F 17/30867 |
| | | | | 707/704 |
| 2012/0323573 | A1* | 12/2012 | Yoon | G09B 19/06 |
| | | | | 704/236 |
| 2013/0132086 | A1* | 5/2013 | Xu | G10L 15/01 |
| | | | | 704/257 |
| 2013/0155237 | A1* | 6/2013 | Paek | G06F 1/1632 |
| | | | | 348/148 |
| 2013/0223635 | A1* | 8/2013 | Singer | H04R 1/1041 |
| | | | | 381/56 |
| 2013/0229508 | A1* | 9/2013 | Li | G06F 1/3287 |
| | | | | 348/77 |
| 2013/0297957 | A1* | 11/2013 | Husted | H04W 52/0293 |
| | | | | 713/323 |
| 2013/0339028 | A1* | 12/2013 | Rosner | G10L 15/222 |
| | | | | 704/275 |
| 2014/0274203 | A1 | 9/2014 | Ganong, III et al. | |
| 2014/0278394 | A1* | 9/2014 | Bastyr | G10L 21/0208 |
| | | | | 704/233 |
| 2014/0278435 | A1* | 9/2014 | Ganong, III | G10L 15/22 |
| | | | | 704/275 |
| 2014/0358552 | A1 | 12/2014 | Xu | |
| 2016/0109921 | A1* | 4/2016 | Chen | G06F 1/10 |
| | | | | 713/322 |
| 2018/0024811 | A1* | 1/2018 | De Vaan | G06F 3/167 |

\* cited by examiner

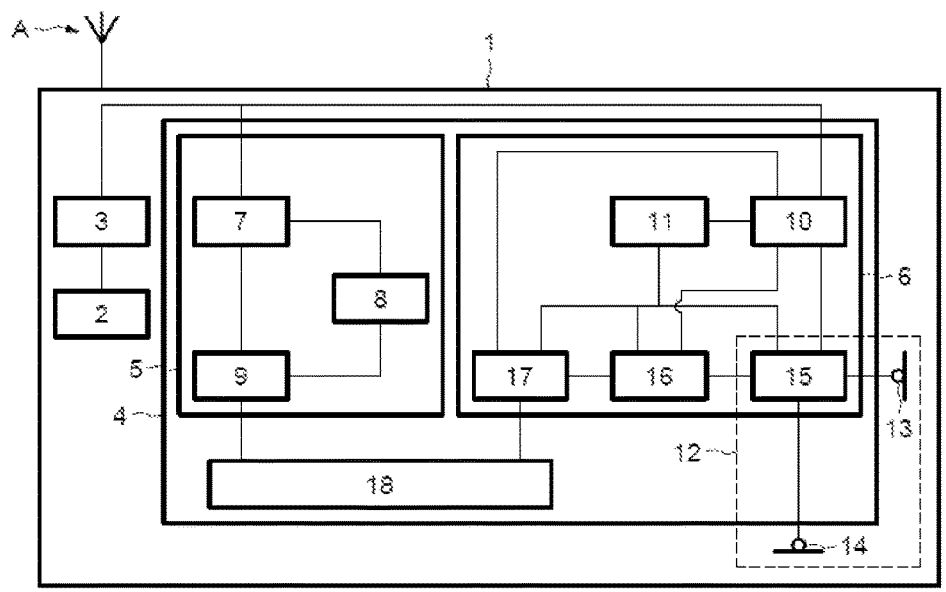
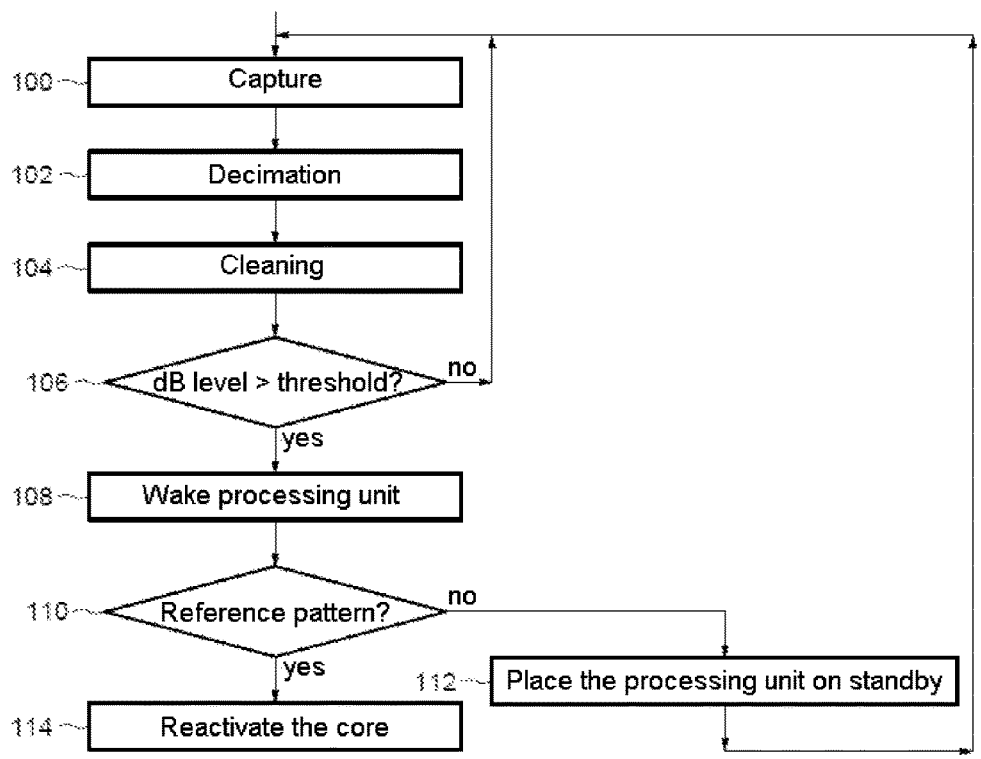

ELECTRONIC DEVICE COMPRISING A WAKE UP MODULE DISTINCT FROM A CORE DOMAIN

This application claims priority to French Application No. 1462541, filed on Dec. 16, 2014, which application is hereby incorporated herein by reference.

TECHNICAL FIELD

Embodiments of the present invention relate to an electronic device comprising a wake up module distinct from a core domain.

BACKGROUND

Electronic apparatuses, notably mobile cellular telephones, smart watches and smart glasses, increasingly comprise modules making it possible to carry out a voice recognition function. This function notably makes it possible to control the electronic apparatus vocally.

In order that the apparatus can detect vocal commands at any time, it is desirable to monitor and detect the signals in the environment of the apparatus and notably in its sound environment.

Electronic apparatuses operating on battery power such as mobile cellular telephones are confronted with a problem related to the optimizing of energy consumption during continuous monitoring of the sound environment searching for possible vocal commands.

In order to economize the battery of an electronic apparatus, the latter generally comprises a standby mode in which the electrical power supply is maintained at the minimum in order to keep a minimum of electronic elements operating.

However, when the electronic apparatus is on standby, the latter must come out of its standby state before being able to carry out the process related to the vocal command. A user generally wishes to be able to access the functionalities of the apparatus quickly. It is the therefore necessary to be able to come out of the standby state quickly in order to respond to a vocal command by the user. One possibility is to provide a reactivating button.

Similarly, when the electronic apparatus is not on standby but in an active state, the electronic apparatus does not itself distinguish a vocal command intended for it from a vocal command intended for another apparatus. It is the therefore necessary to provide a method for distinguishing at what time a vocal command is intended for the apparatus.

An example of a known method for detecting the surrounding sound environment is the continuous audio process, or "continuous audio processing", for waking a telephone. This type of method is known by the expression "Always ON Audio" or "AON Audio", because the audio voice recognition circuit is kept powered and in continuous operation.

The major disadvantage of such a system is the high energy consumption, given the continuous power supply of the voice recognition circuit.

SUMMARY

The present invention relates generally to a system and method, and, in particular embodiments, to a system and method for embodiments of the invention relate to electronic devices comprising a processing core and a separate module intended to wake the electronic apparatus in which the device is installed, for example a mobile cellular telephone, by a vocal command.

According to one embodiment, an electronic device is proposed whose architecture makes it possible to minimize the energy consumption of an electronic apparatus in which is it fitted, the apparatus furthermore comprising a system for recognition of vocal commands.

According to one aspect, an electronic device is proposed comprising a processing core and an appended module coupled to the core and separate from the said core, the core comprising a first power supply circuit, a first clock and a recognition circuit to recognize multiple vocal commands timed by the first clock.

According to a general feature of this aspect, the core has a standby state and the appended module comprises a second power supply circuit independent of the first power supply circuit, a second clock independent of the first clock and having a frequency lower than that of the first clock, a digital processing unit timed by the second clock comprising at least a first means of capturing a first sound signal, and configured to deliver a processed sound signal, and a processing unit configured in order, in the presence of a parameter of the processed sound signal greater than a threshold, to analyze the content of the processed sound signal and to deliver, when the content of the sound signal comprises a reference pattern, an activating signal to the core that can take it out of its standby state.

As the second power supply circuit provided for powering the appended module is independent of the first power supply circuit provided for powering the core or even the rest of the electronic elements of the apparatus, the second power supply circuit can be sized and configured to power only the appended module. Thus, the energy consumption is minimized due to the adaptation of the second power supply circuit to the appended module.

By providing a second clock solely for the appended module with a frequency lower than the frequency of the first clock intended for timing the core and/or the other electronic elements of an electronic apparatus comprising the device, the energy consumption of the module is low.

In fact, the lower the frequency of a clock, the lower is the energy consumption. Thus, by timing the appended module using a low frequency clock, the electrical energy necessary for powering the appended module is low notably with respect to the core whose elements are timed by a clock of higher frequency. As the necessary electrical power supply is low, the second power supply circuit can be reduced even more in comparison with the power supply circuit of the core.

The parameter of the processed sound signal can for example be the average level of the sound signal, or its peak factor, or again the level of this signal at different frequencies, without these examples being limiting.

The first means of capture can be a digital or analog microphone.

As the appended module is designed for the exiting from the standby mode of the electronic apparatus in which the electronic device is installed, the processing unit can be configured to wake the electronic apparatus, notably the core of the device, solely in response to the detection of a reference pattern such as a keyword.

The second clock can advantageously be less precise than the first clock. In fact, a clock requiring less precision consumes less current.

Advantageously, the processing unit can have a standby state and can be configured to exit from its standby state in the presence of the processed sound signal level higher than the threshold.

By putting the processing unit of the appended module on standby, the energy consumption of the appended module can be low for as long as a processed sound signal does not exceed a detection threshold corresponding for example to a sound level threshold of the processed signal.

Thus, for example, when the processing unit is on standby, the only items powered and timed by the second clock are the digital processing unit and a comparator configured to compare the sound level of the processed signal with a sound level threshold notably expressed in decibels. The processing unit is therefore taken out of its standby state solely in the case where a sufficiently loud sound has been captured by the digital processing unit.

In this embodiment, the appended module preferably comprises a local interconnection circuit able to couple the processing unit to the said second clock in order to take it out of its standby state.

When the processing unit is on standby, it is coupled to the second power supply circuit, which powers it, and decoupled from the second clock in order to reduce its electrical consumption to the minimum.

Advantageously, the digital unit can comprise a single means of capture, the processed sound signal corresponding to the sound signal captured by the single digital means of capture.

The capture means is preferably a digital microphone positioned on the electronic apparatus in such a way as to pick up the vocal commands coming from the user's mouth.

As a variant, the digital unit can comprise a first capture means and at least one supplementary capture means disposed at a location separate from that of the first capture means and configured to capture a supplementary sound signal, and processing unit configured to reduce the ambient noise on the basis of the first sound signal and the supplementary sound signal in order to deliver the processed sound signal.

The first capture means can be a digital microphone disposed for example on the front face of a telephonic apparatus, facing the mouth of a user for example, in order to capture the user's commands.

The supplementary capture means can be digital microphones mounted on the rear face of the mobile cellular telephone in such a way as not to face the user's mouth. This arrangement makes it possible for the supplementary microphones to capture the environmental sounds that can pollute the sound signal coming from the mouth of the speaker and which can hamper the detection of the vocal command in the signal.

In the case where several supplementary capture means are used, the supplementary sound signals are advantageously combined with weighting coefficients in order to obtain an equivalent supplementary sound signal which is then notably subtracted from the first sound signal.

According to another aspect, an electronic apparatus is provided comprising an electronic device such as defined above.

The electronic apparatus preferably forms a mobile cellular telephone.

BRIEF DESCRIPTION OF THE DRAWINGS

Other advantages and features of the invention will become apparent on examination of the detailed description of an embodiment and of an implementation of the invention, that are in no way limiting, and of the appended drawings in which:

FIG. 1 is a block diagram of an electronic apparatus comprising an electronic device according to an embodiment of the invention; and FIG. 2 is a flowchart of a method for controlling the electronic device shown in FIG. 1 according to an implementation of the invention.

DETAILED DESCRIPTION OF ILLUSTRATIVE EMBODIMENTS

FIG. 1 shows the block diagram of an electronic apparatus comprising an electronic device according to an embodiment of the invention.

In the embodiment shown, the electronic apparatus 1 is a mobile cellular telephone comprising a transceiver able to connect to or comprise an antenna 1.

The electronic apparatus 1 comprises a battery 2, a first general power supply circuit 3 coupled to the battery 2 and to the electronic elements of the apparatus 1, and notably to an electronic device 4.

The electronic device 4 comprises an electronic processing core 5 and an appended electronic module 6 separate from the core 5.

The core 5 comprises a first power supply circuit 7 connected at its input to the general power supply circuit 3, a first clock 8 having a first timing frequency and a circuit 9 to recognize multiple vocal commands timed by the signal of the first clock 8 and powered by the first power supply circuit 7. The circuit 9 of recognition of multiple vocal commands notably comprises a microprocessor configured to recognize a plurality of different vocal commands and to deliver these commands to a microprocessor of the apparatus 1 in order to control the functions related to the commands.

The appended module 6 comprises a second power supply circuit 10 connected at its input to the general power supply circuit 3. The second power supply circuit 10 is independent from the first power supply circuit 7 of the core 5.

The appended module 6 also comprises a second clock 11 that is independent from the first clock 8 and has a second timing frequency lower than the first timing frequency of the first clock 8 of the core 5. The lower the frequency of a clock, the less energy this clock consumes. In fact, the second clock 11, and therefore the appended module 6, consumes less electrical energy than the core 5 when operating.

The appended module 6 furthermore comprises a digital processing unit 12 powered by the second power supply circuit 10 and timed by the second clock 11. The digital processing unit 12 comprises a first digital microphone 13 fixed on a front face of the apparatus 1 in such a way as to face the mouth of a user and to receive the user's vocal commands. The digital processing unit 12 also comprises a second digital microphone 14 fixed on a rear face of the apparatus 1 in such a way as not to face the mouth of the user and to capture the environmental noise.

The microphones 13 and 14 can also be analog microphones, each coupled at its output to an analog-to-digital converter.

The digital processing unit 12 comprises processing unit 15 that is able to receive the sound signal captured by each of the two digital microphones 13 and 14 and to deliver a processed sound signal free from the ambient noise as much as possible.

In the case of a digital processing unit 12 comprising only a single digital microphone, the processed signal delivered by the digital processing unit corresponds to the sound signal captured by the single digital microphone.

In the embodiment shown, the processing unit 15 is configured to deliver a processed sound signal whose ambient noise has been reduced or even eliminated, from the sound signal captured by the first digital microphone 13 placed on the front face of the apparatus 1 and from the sound signal captured by the second digital microphone 14 placed on the rear face of the apparatus 1 for capturing the ambient noise. The processing unit 15, notably comprising a subtractor, thus delivers a processed sound signal cleansed of the ambient noise and in which there essentially remains the vocal command of the user if there is one.

The digital processing unit 12 thus continuously records low frequency sound via the two digital microphones 12 and 13. The processing unit 15 of the digital processing unit 12 comprises an input stage for decimation of the sound signals received from the digital microphones 13 and 14 in order to create samples of sound signals to process and possibly to analyze.

The appended module 6 furthermore comprises a comparator 16 and a processing unit 17, for example a microcontroller, configured to analyze the content of the processed sound signal.

The input of the comparator 16 is connected to the output of the digital processing unit 12 in order to receive the processed sound signal, and the output of the comparator 16 is connected to a control input of the processing unit 17. The comparator 16 compares for example the sound level of the processed sound signal with a detection threshold corresponding to a sound level in decibels.

The processing unit 17 has a standby state in which its clock input is blocked so that the processing unit is no longer timed by the signal of the second clock and does not operate. The processing unit 17 nevertheless remains powered by the second power supply circuit 10 during its standby state.

When the processed sound signal is greater than the threshold, the comparator 16 delivers an activation signal to the processing unit 17. The activation signal commands the unblocking of the clock input of the processing unit 17. The exit from standby of the processing unit 17 is therefore characterized by a resumption of its timing by the signal of the second clock 11.

At the same time as the activation signal of the processing unit 17, the comparator also transmits the processed sound signal for analysis by the processing unit 17.

As a variant, the digital processing unit 12 could deliver the processed sound signal simultaneously to the comparator 16 and to the processing unit 17, the comparator 16 then only delivering the activation signal of the processing unit 17 when the sound level of the processed sound signal is greater than the detection threshold. If the processed sound signal has a sound level lower than the threshold, the activation signal is not delivered, which results in the processing unit not exiting from its standby state and the processed sound signal is not analyzed by the processing unit 17.

In another variant, the comparator 16 can deliver the activation signal to a local interconnection circuit comprised in the appended module 6 only, the processing unit 17 and the second clock 11 being connected via the interconnection circuit.

When the processing unit 17 has exited from its standby state, it analyzes the received processed sound signal. The analysis comprises a search for a reference pattern corresponding for example to the sound signal of a keyword for waking the apparatus 1. The search is carried out conventionally for example by frequency comparison of the sound signal with the frequency signature of the reference pattern.

If the reference pattern is detected, the processing unit 17 delivers a signal for reactivation of the electronic apparatus 1 and notably of the core 5.

The electronic device 4 comprises an interconnection circuit 18 making it possible to connect the output of the processing unit 17 of the appended module 6 to the processing unit 9 of the core 5 to command the activation of the core 5.

FIG. 2 shows a flowchart of a method for controlling the electronic device 4 shown in FIG. 1 according to an implementation of the invention.

In a first step 100, sound is captured continuously by means of the two digital microphones 13 and 14.

In a next step 102, the captured sound signals are decimated in order to obtain successive samples of constant size.

Then, in a step 104, a processing of the sound signal is carried out in order to reduce the ambient noise on the basis of the sample of the sound signal captured by the second digital microphone 14 and the corresponding sample of the sound signal captured by the first digital microphone 13. The processed sound signal is thus cleansed of the ambient noise and essentially comprises the vocal command of the user it there is one.

In a next step 106, the processed sound signal is then compared with a threshold for activation of the processing unit 17. If the sound level of the processed sound signal is below the activation threshold, there is a return to the initial step 100 in order to analyze the next sample.

On the other hand, if the sound level of the processed sound signal is above the activation threshold, the processing unit 17 is woken in a step 108. The waking, that is to say the reactivation, of the processing unit 17 is carried out by a resumption of the timing of the processing unit 17 by the signal of the second clock 11.

In a next step 110, the processing unit 17 searches for the presence of the reference pattern in the processed sound signal.

If the reference pattern is not detected in the processed sound signal, the processing unit 17 is switched back into its standby state and stops being timed by the second clock 11, and there is a return to the initial step 100.

On the other hand, if the reference pattern is detected in the processed sound signal, the processing unit 17 delivers, in a step 114, a signal for the activation of the core 5. The core 5 is then activated as well as the recognition circuit.

This device makes it possible to have an electronic apparatus configured to receive a vocal command to wake the apparatus before receiving vocal commands to request the apparatus to carry out certain specific functions. Thus, to request the apparatus, whilst on standby, to carry out a function, it suffices to give a unique vocal command followed by a vocal command to carry out the desired function. This can be done for example on the basis of a waking keyword and a request phrase for the function to be carried out.

The architecture of the electronic device furthermore makes it possible to carry out these functions whilst minimizing the energy consumption of the apparatus, by allowing a reduced operation on standby nevertheless authorizing the reception of a vocal wake command and thus increasing the service life of the electronic apparatus between two recharges.

What is claimed is:

1. A device comprising:
a processing core having a processing core active state and a processing core standby state;
an appended module coupled to the processing core and separate from the processing core, the appended module having an appended module active state and an appended module standby state;
wherein the processing core comprises:
a first power supply circuit;
a first clock; and
a sound recognition circuit configured to recognize multiple vocal commands, the sound recognition circuit being configured to be timed by the first clock; and
wherein the appended module comprises:
a second power supply circuit that is independent of the first power supply circuit, the first power supply circuit further being independent of the second power supply circuit;
a second clock that is independent of the first clock and has a frequency lower than that of the first clock;
a digital processing unit timed by the second clock configured to capture a first sound signal and to deliver a processed sound signal;
a processing unit configured to be timed exclusively by the second clock, the processing unit comprising a clock input that is coupled to the second clock when the appended module is in the appended module active state, and decoupled from the second clock and any other clock signal when the appended module is in the appended module standby state, the processing unit further being configured to, when the appended module is in the appended module active state, analyze content of the processed sound signal and, when the content of the processed sound signal comprises a reference pattern, to deliver an activating signal to the sound recognition circuit of the processing core that can take the processing core out of the processing core standby state, wherein the processing unit is configured to be powered by the second power supply circuit when the appended module is in the appended module standby state and when the appended module is in the appended module active state;
a comparator coupled between the digital processing unit and the processing unit, the comparator being configured to modulate coupling of the clock input of the processing unit to the second clock in response to a comparison of a parameter of the processed sound signal to a threshold; and
a local interconnection circuit coupled to the processing unit, the local interconnection circuit being configured to couple the clock input of the processing unit to the second clock in order to take the appended module out of the appended module standby state and into the appended module active state.

2. The device according to claim 1, wherein the processing unit is configured to analyze the content of the processed sound signal in response to the parameter of the processed sound signal being greater than the threshold.

3. The device according to claim 2, wherein the the appended module is configured to exit from the appended module standby state and enter the appended module active state in response to the parameter of the processed sound signal being higher than the threshold.

4. The device according to claim 1, wherein the digital processing unit comprises means for capturing the first sound signal.

5. The device according to claim 1, wherein the digital processing unit comprises a digital microphone.

6. The device according to claim 5, wherein the digital processing unit further comprises a second digital microphone spaced from the digital microphone, wherein the content of the processed sound signal is analyzed based upon sound signals received the digital microphone and the second digital microphone.

7. A device, comprising:
a processing core having a processing core active state and a processing core standby state;
an appended circuit coupled to the processing core and separate from the processing core, the appended circuit having an appended circuit active state and an appended circuit standby state;
wherein the processing core comprises:
a first power supply circuit;
a first clock; and
a sound recognition circuit configured to recognize multiple vocal commands timed by the first clock; and
wherein the appended circuit comprises:
a second power supply circuit that does not draw power from the first power supply circuit and that does not supply power to the first power supply circuit in the appended circuit active state, the appended circuit standby state, the processing core active state, and the processing core standby state;
a second clock that does not draw a clock signal from or supply the clock signal to the first clock, the second clock having a frequency lower than that of the first clock;
a digital processing unit comprising a microphone and timed by the second clock configured to capture a first sound signal and to deliver a processed sound signal; and
a processing unit configured to analyze content of the processed sound signal and, when the content of the processed sound signal comprises a reference pattern, to deliver an activating signal to the processing core that can take the processing core out of the processing core standby state.

8. The device according to claim 7, wherein the processing unit is configured to analyze the content in response to a parameter of the processed sound signal being greater than a threshold.

9. The device according to claim 8, wherein the processing unit has a standby state and is configured to exit from its standby state in response to the parameter of the processed sound signal being higher than the threshold.

10. The device according to claim 9, wherein the appended circuit comprises a local interconnection circuit configured to couple the processing unit to the second clock in order to take it out of its standby state.

11. The device according to claim 7, wherein the digital processing unit further comprises a second microphone spaced from the microphone, wherein the content of the processed sound signal is analyzed based upon sound signals received from the microphone and the second microphone.

12. A device, comprising:
a processing core having a processing core active state and a processing core standby state;
an appended circuit coupled to the processing core and distinct from the processing core, the appended circuit having an appended circuit active state and an appended circuit standby state;

wherein the processing core comprises:
- a first power supply circuit;
- a first clock configured to be powered by the first power supply circuit; and
- a sound recognition circuit configured to be powered by the first power supply circuit and to recognize multiple vocal commands, the sound recognition circuit being configured to be timed by the first clock; and wherein the appended circuit comprises:
- a second power supply circuit distinct from the first power supply circuit and that does not draw power from the first power supply circuit and that does not supply power to the first power supply circuit in the appended circuit active state, the appended circuit standby state, the processing core active state, and the processing core standby state;
- a second clock that does not draw a clock signal from or supply the clock signal to the first clock, the second clock having a frequency lower than that of the first clock;
- a digital processing unit configured to be powered by the second power supply circuit, the digital processing unit being configured to be timed by the second clock, to capture a first sound signal, and to deliver a processed sound signal; and
- a processing unit configured to analyze content of the processed sound signal and, in response to the content of the processed sound signal comprising a reference pattern, to deliver an activating signal to the processing core that can take the processing core out of the processing core standby state and into the processing core active state.

13. The device according to claim 12, wherein the processing unit is configured to analyze the content in response to a parameter of the processed sound signal being greater than a threshold.

14. The device according to claim 13, wherein the processing unit has a standby state and is configured to exit from its standby state in response to the parameter of the processed sound signal being higher than the threshold.

15. The device according to claim 14, wherein the appended circuit comprises a local interconnection circuit configured to couple the processing unit to the second clock in order to take it out of its standby state.

16. The device according to claim 12, wherein the digital processing unit comprises a digital microphone.

17. The device according to claim 16, wherein the digital processing unit further comprises a second digital microphone spaced from the digital microphone, wherein the content of the processed sound signal is analyzed based upon sound signals received the digital microphone and the second digital microphone.

18. The device according to claim 17, wherein the digital processing unit is further configured to filter out ambient noise based upon sound signals received the digital microphone and the second digital microphone.

19. The device according to claim 12, wherein the processing unit is configured to deliver the activating signal to the processing core in response to a key word being present in the processed sound signal.

* * * * *